Dec. 21, 1965   R. B. BLIZARD   3,224,709
METHOD AND APPARATUS FOR DOCKING VEHICLES
Filed Sept. 13, 1962   3 Sheets-Sheet 2

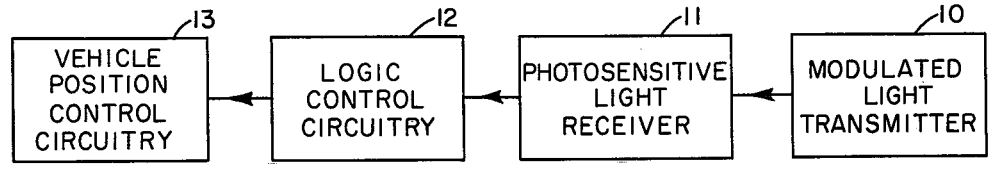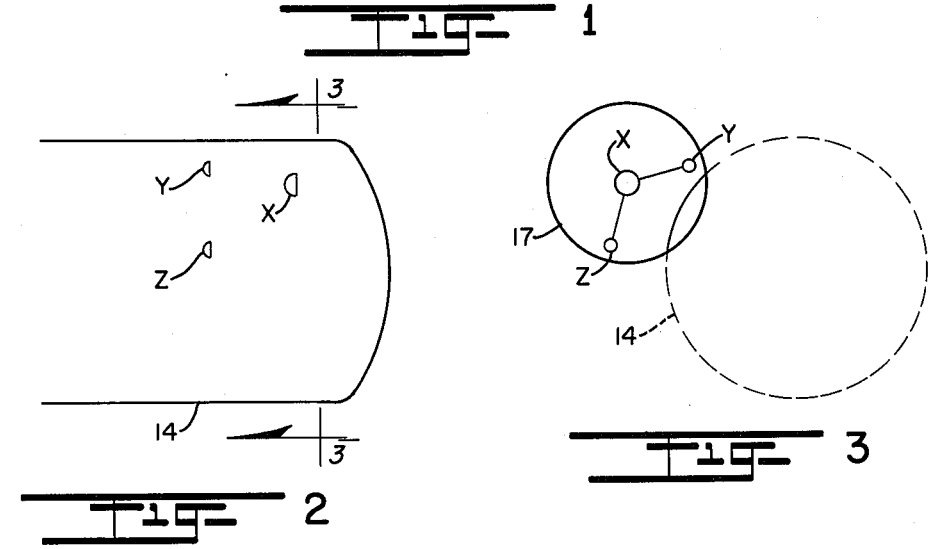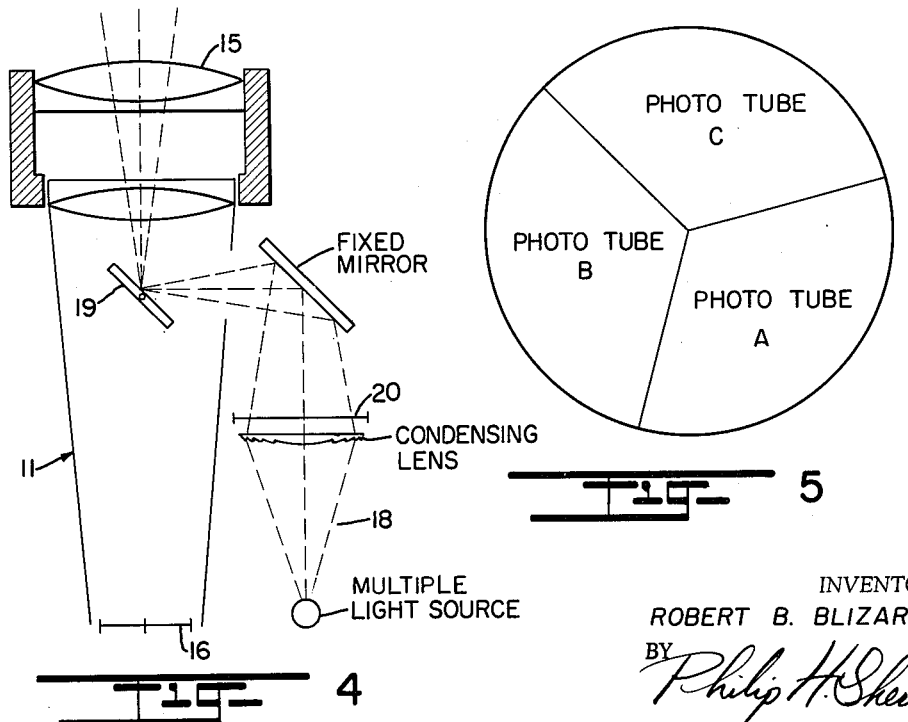

INVENTOR.
ROBERT B. BLIZARD
BY
ATTORNEY

Dec. 21, 1965   R. B. BLIZARD   3,224,709
METHOD AND APPARATUS FOR DOCKING VEHICLES
Filed Sept. 13, 1962   3 Sheets-Sheet 3
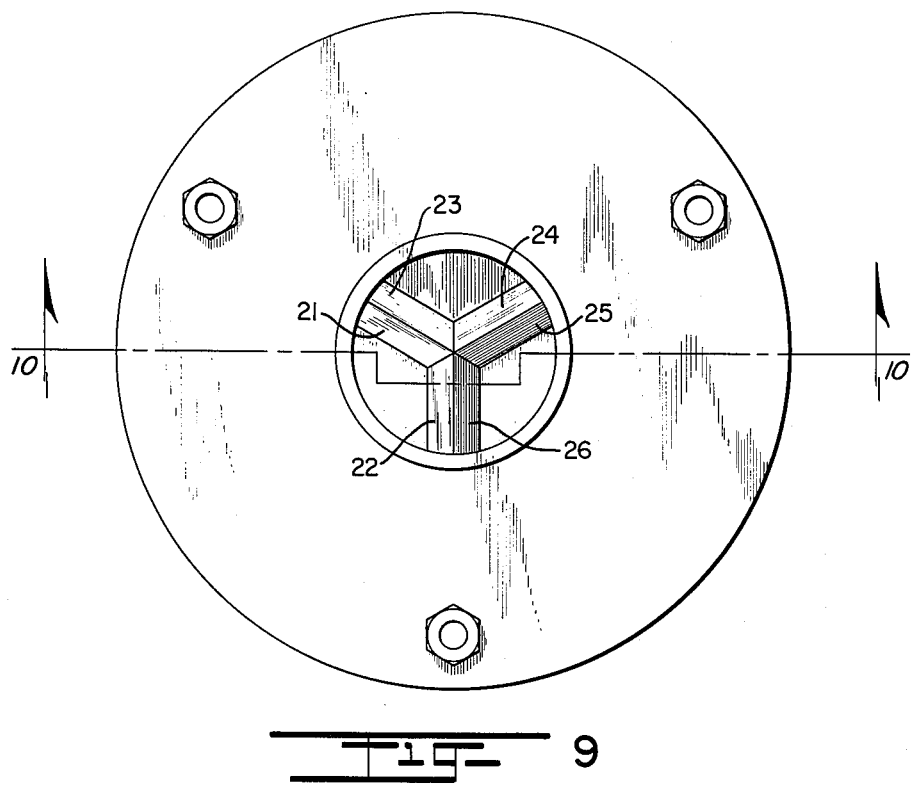
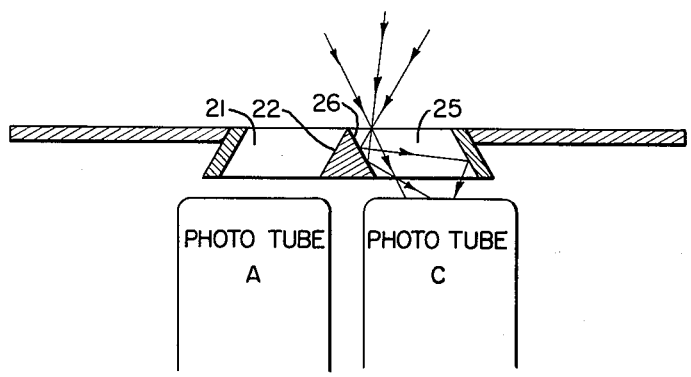
INVENTOR.
ROBERT B. BLIZARD
BY
ATTORNEY United States Patent Office 3,224,709
Patented Dec. 21, 1965

3,224,709
METHOD AND APPARATUS FOR DOCKING VEHICLES
Robert B. Blizard, Littleton, Colo., assignor to Martin-Marietta Corporation, Baltimore, Md., a corporation of Maryland
Filed Sept. 13, 1962, Ser. No. 223,390
10 Claims. (Cl. 244—1)

This invention relates broadly to apparatus for docking objects with respect to each other, the objects having relative motion therebetween. The invention will be illustrated herein by its application to the rendezvous of space vehicles but it is not limited to this application.

It is necessary to indicate both position and attitude of a vehicle such as a ferry relative to a space station while the distance between the two bodies or satellites approaches zero. Microwave radar is useful for measuring range at very small distances but is not suitable for also measuring direction and relative attitude at close range. Thus a sensor in a system for docking a ferry at a space station should be capable of indicating six components of the position and attitude of the ferry relative to the space station. These are range, azimuth, elevation, roll, pitch and yaw. Of these components, range readily can be measured by the use of microwave radar, but radar is not readily adapted for sensing the direction and attitude variables.

In the task of supplying and servicing satellites, it is highly desirable to be able to dock automatically. This is especially the case if both ferry and satellite are unmanned. Even if manned, it is desirable to relieve the pilot of the task of judging relative range and attitude of the two vehicles. Furthermore, there is the problem of assembling a space station in sections and providing it with supplies before manning it. The satellite and ferry generally are powered and in orbit. It is necessary to maneuver the powered ferry to correct any errors in course and position so that a soft docking of the ferry at the satellite can be made promptly. Promptness is important so that fuel is conserved. For similar reasons, it is desirable to avoid the necessity of making difficult and prolonged computations before docking.

Accordingly, it is an important object of this invention, to provide a system for efficiently accomplishing close range rendezvous and docking of space vehicles.

Another object of this invention is to provide an optical radar system, as distinguished from a microwave radar system, for automatically docking a vehicle at a space station.

An additional object of this invention is to provide such a system employing an optical sensor for the purpose of supplying input information into the system to automatically dock a vehicle at a space station.

Additional features and objects of this invention will become apparent from the following description, which is given primarily for purposes of illustration, and not limitation.

Stated in general terms, the objects of this invention are attained by providing a system wherein the vehicle to be docked is equipped with optical means adapted to transmit a modulated, sectored light pattern toward a space station equipped with a plurality of oriented reflectors. In a specific embodiment, a five-sector light pattern is transmitted for reflection by three reflectors mounted at sixty degree intervals around a circular arc or circumference on the space station. The light pattern is reflected back to a photosensitive receiver on the vehicle to be docked. In the specific embodiment, this receiver is a tripartite photosensitive receiver. The reflected light pattern produces signals in the photosensitive receiver which, in turn, activate appropriate servo means to accomplish a desired automatic guidance and control of the vehicle, during docking, by maintaining a desired, predetermined relationship between the reflector images superimposed upon the field of the photosensitive receiver. In the specific embodiment, the servo means effects the automatic centering of the middle reflector, of the three oriented reflectors, on the field of the photosensitive receiver. Suitable logic circuits are included, in combination with the photosensitive receiver and the servo means, to determine the control characteristics and give appropriate information regarding the orientation of the vehicle to be docked and the range between the vehicle and the space station.

A more detailed description of a specfic embodiment of the invention is given with reference to the accompanying drawings wherein:

FIG. 1 is a block diagram schematically showing the modulated light transmitter, the photosensitive light receiver, the logic control circuitry and the vehicle position controlling servo which are mounted in combination on the vehicle to be docked at a space station;

FIG. 2 is a schematic side elevational view diagrammatically showing three reflectors mounted on the space station;

FIG. 3 is a schematic cross-sectional view taken as along a line 3—3 of FIG. 2, diagrammatically showing the angular orientation of the three reflectors;

FIG. 4 is a schematic longitudinal section, diagrammatically showing the modulated light transmitter and the photosensitive light receiver arranged in combination;

FIG. 5 is a schematic end view diagrammatically showing a tripartite field of view of the photosensitive light receiver of FIG. 4;

FIG. 9 is an end view of the photoelectric tube receiver assembly of the invention, and FIG. 10 is a sectional view on the line 10—10 of FIG. 9.

Figure 6:
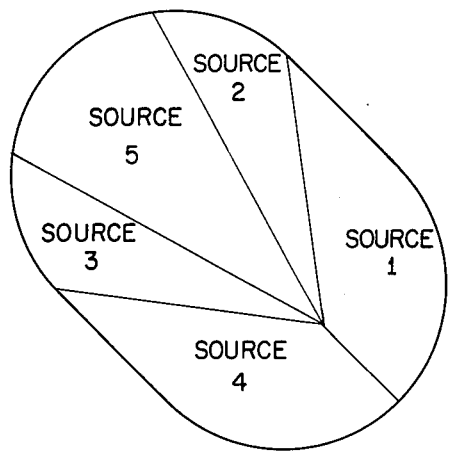
FIG. 6 is a schematic end view diagrammatically showing the five sector light pattern apparatus of FIG. 4 which transmits modulated light and represents the light pattern that is projected from the multiple light source of FIG. 4.

The block diagram of FIG. 1 shows the interrelationship of the modulated light transmitter 10, the photosensitive light receiver 11, the logic control circuitry 12, and the vehicle position controlling servo 13 which are carried by the vehicle to be docked (not shown) at a space station 14, FIGS. 2 and 3. Mounted on the space station 14 are at least three optical corner reflectors designated X, Y and Z. The reflector designated X, positioned somewhat nearer the vehicle to be docked (not shown) has a larger diameter, such as about 75 mm., than the other reflectors Y and Z, which have diameters of about 10 mm., for example.

Before the docking system of FIG. 1 is given command of the vehicle to be docked, the vehicle is pointed toward the space station 14 in a general alignment with respect to some common reference axis (not shown) perpendicular to the central axis (not shown) of the vehicle and the space station. When the vehicles are sufficiently close to each other to initiate the docking operation, the modulated light transmitter 10 is put into operation.

Figure 8:
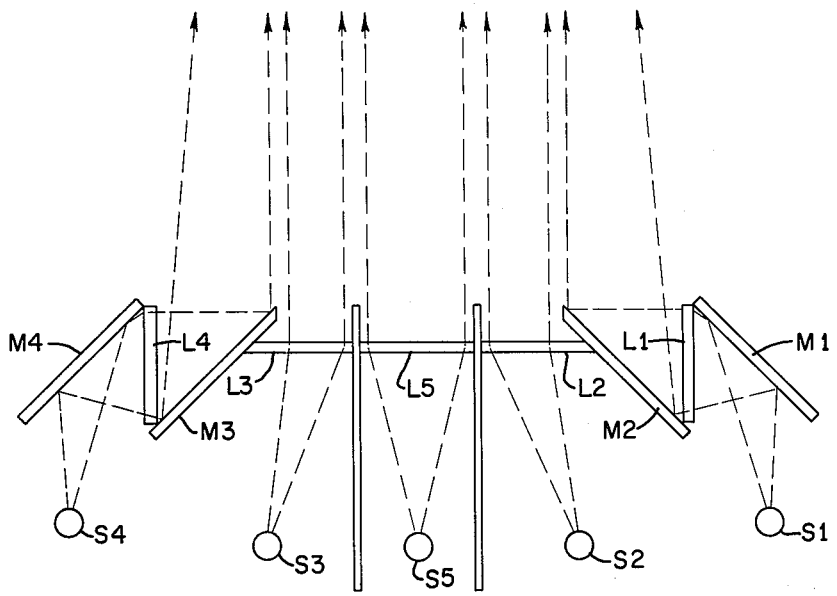
FIG. 8 is a schematic longitudinal view diagrammatically showing details of the five sector light pattern apparatus showing five independent light sources.

Modulated light transmitter 10 includes five independent light sources $S_1$, $S_2$, $S_3$, $S_4$ and $S_5$, as shown in FIG. 8. These five light sources are positioned in the five sector light pattern apparatus in a configuration such that they produce a pattern having a shape as shown in FIG.

6 at the general vicinity of the space station. The light shining in the sectors designated source 1 to 5, respectively, of FIG. 6, is turned on and off sequentially at the transmitter 10.

At the space station 14, the three cubic corner reflectors X, Y and Z are positioned around the circumference of the space station as shown in FIGS. 2 and 3 so that the lines XY and XZ are separated by 120°. All three of the reflectors X, Y and Z are then sensed by a photosensitive light receiver 11, either located very close to the transmitter 10, or in a transmitter-receiver arrangement as shown in FIG. 4.

The light returning to the receiver 11 is split by means of the light divider shown in FIGS. 9 and 10, into three segments shown as sections A, B and C, respectively, in FIG. 5. The reflecting surfaces of the wedge shaped divider sections are represented by numerals 21–26 (FIG. 9). The manner in which reflected light from the reflecting means X, Y and Z is fed into the phototubes is shown diagrammatically in FIG. 10. Each of the three light segments is designed to activate a respective corresponding phototube designated phototube A to C, respectively. Thus the light that actually reaches the receiver 11 from any given reflector X, Y, Z falls into one of the three receiver segments or sections A, B, C after having originated in one of the five pattern areas designated source 1 to 5, respectively, of transmitter 10, and thereby provides the superimposed, or over-lay effect shown in FIG. 7.

Figure 7:
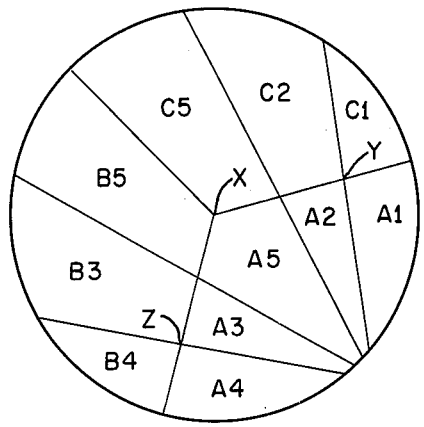
FIG. 7 is a schematic view diagrammatically showing combined fields of the tripartite photosensitive light receiver and the five sector modulated light transmitter.

The brightest beam of reflected light, which is reflected by reflector X, is automatically centered in the middle of the pattern of FIG. 7 by action of the vehicle position controlling servo 13. Any error signals resulting from the Y and Z reflections not being at the A3, B3, A4, B4 intersection and the A1, C1, A2, C2 intersection, respectively, of the over-lay pattern of FIG. 7, are cancelled out by positioning the vehicle to be docked. In addition, the distances between X and Y on the one hand, and X and Z on the other, are equalized by the proper positioning of the vehicle to be docked.

These errors are created by pitch, roll and yaw, as well as axial misalignment. As the range between the space station and the vehicle to be docked decreases, points Y and Z on the over-lay pattern of FIG. 7 move along the respective segment or section lines of the over-lay pattern away from point X. The light pattern produced by the transmitter 10 is shifted by the servo 13 to hold the light reflections of reflectors Y and Z at the above-mentioned intersections, thus also providing an indication of range. At some point near the edge of the receiver 10 pattern of FIG. 5 or 7 the range will be equal to zero and the vehicle will be docked at the space station.

A more detailed description of the principles of operation of the system of this invention is given below with reference to the appended drawings.

An objective lens 15 in the receiver 11 forms an image on the receiver field 16 of the scene before it. This is shown at 17 in FIG. 3, which is the field of view of the receiver 11. The large, central reflector X, is in the center of the field of view 17, and the smaller reflectors Y and Z appear at equal distances from X. The angle ZXY, measured in the plane of the image, is 120°, when the vehicle to be docked and the space station are properly aligned.

Observation of the three targets X, Y and Z will yield information on the six variables involved. Pitch and yaw will be detected by apparent displacement of all targets together. Roll will be detected as a rotation of the pattern around the center. Range can be measured by the apparent separation of the targets. Displacements of the vehicle perpendicular to the axis of the space station will cause the image of the X reflector to move relative to the images of the more distant Y and Z reflectors.

The range measurement will be affected by displacement of the vehicle away from the plane which is the perpendicular bisector of the line YZ. Likewise, the other measurements cannot be made strictly independently. However, this will not seriously affect the docking control problem provided that the maneuver starts from the right general direction and that the vehicle then approaches the axis of the space station as it comes closer. Three reflectors are the minimum that can be used for this type of receiver. Each target permits measurement of two independent variables; three are necessary to obtain the six parameters required for docking.

FIGURE 4 is a schematic representation of the optical system. The objective lens 15 forms an image of the reflectors X, Y and Z on the receiver field 16. Illumination of the reflectors comes from a projector or transmitter 18 which shares the same objective lens 15. A pivoted mirror 19 permits an effective shift of projector pattern as will be described. The received image is split among three phototubes as shown schematically in FIGURE 5.

The projector 18 illuminates the object space (where the reflectors are) in a pattern which is illustrated in FIGURE 6. There are five light sources designated 1 to 5, which may be small flash tubes operated in sequence, so that signal pulses from the receiver 11 may be identified with the individual sources by their times of occurrence.

The combination of receiver and projector fields 16 and 20 are shown in FIGURE 7. The space in front of the instrument is now divided into eleven regions which can be distinguished by the times at which pulses appear on the outputs of the three phototubes A, B and C. For instance, if a light pulse is received at time 2 on phototube C, we know that one of the reflectors X, Y or Z is (at least partly) in the region marked C2 in FIGURE 7.

In operation, the control system works to place X at the common point of A5, B5, C5; Y at the common point of A1, A2, C1, C2; and Z at the common point of A3, A4, B3, B4. This is accomplished by the following motions. The receiver 11 is gimballed in both azimuth and elevation. The field 16 of the receiver 11 with the phototubes A, B and C is rotatable about the optical axis of the receiver. The pivoted mirror 19 shifts the projected pattern parallel to the line separating regions 1 and 4 of FIGURE 6. The vehicle adjusts its position until it is on the axis of the space station 14.

The angle of the pivoted mirror 19 is a measure of range. As the range decreases, the mirror 19 turns to move the projector pattern 20 to accommodate the greater apparent separation of Y and Z by increasing the distance between the center of the field and the points common to A1, A2, C1, C2; and A3, A4, B3, B4, as shown in FIGURE 7. The motions of the receiver 11 itself are used to place the Y and Z images at the proper points permitting the range to be measured even when the vehicle is neither on the axis of the space station nor properly aligned with it. Zero error signal occurs when X appears at the common point A5, B5, C5 and Y and Z, respectively, appear at the other common points mentioned above.

It will be understood that operation as described above requires that the images of the reflectors be within certain regions of the combined transmitter-receiver space as shown in FIGURE 7. Specifically, X must be within the region spanned by A5, B5, and C5; Y within that spanned by A1, A2, C1, and C2; and Z in the A3, A4, B3, B4 region. This initial positioning or lock-on can be achieved by scanning until the signals from the receiver 11 indicate one image in each of the above mentioned regions. The relative attitude of the two vehicles would, of course, be well enough controlled or known before the scanning started to prevent a complete reversal with the Y and Z reflectors interchanged. Lock-on is facilitated by positioning the pivoted mirror 19 in the "maximum range" position so that the common point of the regions 1, 2, 3, 4, and 5 (FIGURE 6) is in the region A and near the common point of the regions A, B, and C (FIGURE 5).

The direction of the receiver axis is then scanned until reflected light is detected by at least one of the photosensitive detectors. The direction of the receiver axis is then adjusted, according to which of the detectors A, B, and C is receiving the most returned light until all three are receiving equal amounts. Since the X reflector is much larger than the other two, it will return the major portion of the reflected light that enters the receiver. This means that when the light is equally divided among A, B, and C the X reflector will be at the common point of A, B, and C. It is easily seen once this is accomplished the Y and Z images will fall in the 1, 2 and the 3, 4 regions respectively, and the required initial conditions will have been achieved.

The next consideration is how to derive commands from the indications of the instrument. Let us first discuss only the signals received from the two small reflectors Y and Z. These will be used to determine range, roll, pitch, and yaw. It will be understood that yaw and pitch are defined relative to the line of sight, and roll is relative to the space station 14. There are eight different elemental signals which can come from the reflectors Y and Z. We will designate them according to FIGURE 7 by a letter and number as C2, etc. If all eight signals are detected simultaneously, then the reflector Y and Z images must be on the two common points and the adjustments are satisfactory.

In order to simplify the logic we define a set of eight propositions 1, 2, 3, 4, AL, AR, B, C in terms of the fundamental signals.

$$1 = A1 + C1 \qquad AL = A1 + A2$$
$$\overline{1} = \overline{A1} \cdot \overline{C1} \qquad \overline{AL} = \overline{A1} \cdot \overline{A2}$$
$$2 = A2 + C2 \qquad AR = A3 + A4$$
$$\overline{2} = \overline{A2} \cdot \overline{C2} \qquad \overline{AR} = \overline{A3} \cdot \overline{A4}$$
$$3 = A3 + B3 \qquad B = B3 + B4$$
$$\overline{3} = \overline{A3} \cdot \overline{B3} \qquad \overline{B} = \overline{B3} \cdot \overline{B4}$$
$$4 = A4 + B4 \qquad C = C1 + C2$$
$$\overline{4} = \overline{A4} \cdot \overline{B4} \qquad \overline{C} = \overline{C1} \cdot \overline{C2}$$

The plus (+) and dot (·) indicate the Boolean "or" and "and" operations and the bar (—) indicates the negative of a proposition. It is easily seen from FIGURE 7 that each of these propositions indicates that an image appears on one side of one of the boundary lines. It is, of course, possible for an image to appear on both sides since it has a finite size.

Let us consider range measurement first. If the Y and Z images are in the regions 2 and 3 and do not overlap into 1 and 4, then we know that the range indication should be increased to move the boundaries closer to the images. The range indication should also be increased when one image straddles the line and the other is in region 2 or 3. These two conditions are included in the logical expression $2.\overline{4} + 3.\overline{1}$. Similar reasoning can be used to determine when the range indication should be decreased. Therefore, we write for the two commands $$R+ = 2.\overline{4} + \overline{1}.3$$
$$R- = \overline{2}.4 + 1.\overline{3}$$

It may be interesting to see under what conditions the range indication will receive no command to change. If both images straddle their range lines, we have $1.2.3.4$. In this case no adjustment is needed. If one is outside and the other inside we have $1.\overline{2}.3.\overline{4} + \overline{1}.2.\overline{3}.4.$, and we do not know which way to adjust. This will be resolved when the pointing control operates in response to its commands. If we have $\overline{1}.\overline{2} + \overline{3}.\overline{4}$ it indicates that at least one image is missing and a search must be started. It can be shown that all conditions are included in the above states.

Similar reasoning for the roll indication yields the following equations for positive and negative roll indication commands.

$$Q+ = \overline{B}.C + \overline{AL}.AR$$
$$Q- = B.\overline{C} + AL.\overline{AR}$$

For pitch indication we use the most nearly horizontal lines in FIGURE 7 as the significant boundaries:

$$P+ = AL.\overline{3} + \overline{C}.4$$
$$P- = \overline{AL}.3 + C.\overline{4}$$

For yaw indications we have $$Y+ = B.\overline{1} + \overline{AR}.2$$
$$Y- = \overline{B}.1 + AR.\overline{2}$$

To generate the 8 propositions 1, 2, 3, 4, AL, AR, B, C and their negatives requires a total of 32 diodes. For each of the 8 indication commands 6 diodes are needed. Thus the total number of diodes required for the range, pitch, roll, and yaw indication commands is only 80.

The projector 18 is shown schematically in FIGURE 8. Each of the sources $S_1$ to $S_5$ has a lens $L_1$ to $L_5$, respectively, which places its image on the pivoted mirror 19, with the aid of mirrors $M_1$ to $M_4$, as shown. These lenses might conveniently be plastic Fresnel lenses to save space and weight. Optical quality need not be high since it is only necessary to avoid having too much light scattered back into the phototubes A, B and C. The division between the 1 and 2 regions and that between the 3 and 4 regions must be made sharp because the range measuring system depends on them. This is achieved by using the edges of the mirrors $M_2$ and $M_3$. The borders of the region illuminated by $S_5$ are not used for measurement, and can conveniently be made with thin barriers.

The objective 15 should form the image of the projector field 16 at the distance of the small reflectors Y and Z. Because the aperture of the projector 18 is the rather small pivoted mirror 19, the focus is not critical. However, it can be improved by tilting the projector field 20 so that the portions of the 1, 2 and 3, 4 boundaries which are being used are farther from the objective 15 for short ranges. The near reflector X is large and it would not be satisfactory to image it on the receiver field 16. Instead, the image of the projector aperture, which is at twice the reflector distance, is imaged on the receiver field 16. To keep the image sharp at short range a focusing adjustment (not shown) can be coupled to the range measuring system.

This table given below shows a set of system parameters which can be used.

Objective diameter: 63 mm.
Projector aperture: 10 mm.
Diameter field of view: 12°
Diameter of front corner reflector: 75 mm.
Diameter of rear corner reflectors: 10 mm.
Distance from objective to front reflector when docked: 4 m.
Distance from objective to rear reflectors when docked: 5.5 m.
Separation of rear reflectors: 1 m.
Pulse repetition rate of each source: 100/sec.

The logic circuitry for controlling the servo 13 which controls the vehicle to be docked is not shown as circuitry since this is within the normal skill of persons engaged in the logic circuitry art. Similarly, the circuitry and mechanical details of servo 13 are not shown because these are within the ordinary skill of persons engaged in the servo art.

Although the invention has been illustrated by its application to the rendezvous of vehicles in space, it is not limited thereto as it has application in general to docking operations between objects having relative motion therebetween and includes docking between a moving and a stationary object, such as, the landing of a moving vehicle or object on a stationary field or platform, as well as docking operations between two moving vehicles. Obviously, the receiving and transmitting apparatus on one hand and the reflecting apparatus on the other hand can be interchanged between the docking vehicle and the vehicle to which it is docked. The identification of energy sources, such as, sources 1, 2, 3, 4, 5, is not limited to the use of timed pulses as this can be accomplished by other means, such as, the use of characteristic wave lengths or pulses modulated in various ways. Further, the invention is not restricted to the use of energy of a specific wave length for provision of indicating signals as electro-magnetic energy in general may be used with appropriate substitution of transmitting and receiving equipment. Also, the patterns on the transmitter and the receiver are, of course, not restricted to lined patterns or any other form of pattern and may be varied in accordance with the required result. Neither is the invention restricted to the use of automatic control means for moving the docking vehicle in response to relative position indicating signals as this movement may be accomplished by remote control, manual or other means.

The use of the technique disclosed for transmitting a source identification pattern of energy from one body to a plurality of spaced-apart reflecting areas on a second body for reflection of the pattern or a portion thereof to a patterned receiver on the first body to form a combined reference pattern on the receiver indicative of the relative positions of the bodies is not restricted to controlling the orientation of objects with respect to each other but, obviously, has other application. Further, the method of determining the range angle between spaced-apart reflecting areas and a transmitting source is not limited to the application wherein the reflecting areas are located on one object but obviously has application where the reflecting areas themselves are widely spaced or are located on different objects which may be widely spaced apart.

Obviously, many variations and modifications of the present invention are possible in the light of the above teachings. It is, therefore, to be understood that within the scope of the appended claims, the invention can be practiced otherwise than as specifically described.

What is claimed is:

1. A system for docking a vehicle at a space station in space comprising means mounted on the vehicle and adapted for transmitting a light pattern toward a space station, a plurality of reflectors in predetermined orientation mounted on the space station, each reflector receiving and reflecting a substantially different portion of the light pattern, photosensitive receiver means mounted on the vehicle for receiving the reflected light pattern to produce signals in the receiver means, and servo means mounted on the vehicle and adapted for activation by the signals to automatically guide and control the vehicle during docking.

2. A system for docking a vehicle at a space station in space comprising means mounted on the vehicle and adapted for transmitting a sectored light pattern toward a space station, a plurality of reflectors in predetermined spaced relationship with respect to each other mounted on the space station, each reflector receiving and reflecting a substantially different portion of the light pattern, a sectored photosensitive receiver means mounted on the vehicle for receiving the reflected light pattern to produce signals in the receiver means, and servo means mounted on the vehicle and adapted for activation by the signals to automatically guide and control the vehicle during docking.

3. A system for docking a vehicle at a space station in space comprising optical means mounted on the vehicle and adapted for transmitting a five-sectored light pattern toward a space station, at least three reflectors oriented in predetermined spaced and angular relationship with respect to each other mounted in predetermined orientation on the space station, each reflector receiving and reflecting a substantially different portion of the light pattern, a photosensitive receiver means divided into at least three sectors mounted on the vehicle for receiving the reflected light pattern to produce signals in the receiver means, and servo means mounted on the vehicle and adapted for activation by the signals to automatically guide and control the vehicle during docking by maintaining a desired, predetermined relationship between reflector images superimposed upon the sectors of the photosensitive receiver.

4. A system for docking a vehicle at a space station in space comprising optical means mounted on the vehicle and adapted for transmitting a five-sectored light pattern toward a space station, three reflectors oriented in predetermined spaced and angular relationship with respect to each other mounted in predetermined orientation on the space station, each reflector receiving and reflecting a substantially different portion of the light pattern, a photosensitive receiver means containing three sectors mounted on the vehicle for receiving the reflected light pattern to produce signals in the receiver means, logic circuit means and servo means mounted on the vehicle in cooperation with the photosensitive receiver means and each other to determine the control characteristics and give appropriate information regarding the orientation of the vehicle and the range between the vehicle and the space station, said servo means being adapted for activation by the logic circuit means to automatically guide and control the vehicle during docking by maintaining a desired, predetermined relationship between reflector images superimposed upon the sectors of the photosensitive receiver.

5. A system for docking a vehicle at a space station in space according to claim 4, wherein the optical means for transmitting a light pattern and the photosensitive receiver means are cooperatively arranged in a unit employing the same objective lens for transmitting and receiving the light patterns.

6. A system for docking a vehicle at a space station in space according to claim 4, wherein one of the three reflectors is positioned intermediate the other two at a point equidistant from the other two and nearer the vehicle to be docked than the other two, and the desired automatic guidance and control of the vehicle during docking by the servo and logic circuit means is maintained by continuously centering the intermediate reflector on the field of the three sectors of the photosensitive receiver.

7. Means for indicating the angular separation between spaced-apart reflecting objects with respect to a first object comprising, means on said first object for transmitting to said reflecting objects a first pattern comprising a plurality of beams of electromagnetic radiation whereby each reflecting object reflects at least a part of a plurality of said beams of said first pattern, receiver means on said first object constructed to provide a second pattern for receiving said reflected parts of said beams of said first pattern whereby a combined pattern of intersecting lines is formed where intersections provide reference points for locating the images of said reflecting objects, and means for effecting relative movement of said first and second patterns.

8. The method of indicating the relative positions of two objects moving relative to each other which comprises transmitting from a first object a first segmented pattern comprising a plurality of beams of electromagnetic radiation to a second object having a plurality of spaced-apart reflecting areas thereon, reflecting from each of said reflecting areas a part of a plurality of said beams of said transmitted pattern to a receiver on said first object having a second pattern thereon, and overlaying said patterns to form a combined pattern indicative of the relative positions of the two objects.

9. The method of indicating range between two objects which comprises transmitting a first lined pattern of electromagnetic radiation from a first object to a second object having a plurality of spaced-apart reflecting areas thereon, reflecting from each of said reflecting areas a part of different portions of said first pattern back to a receiver on said first object having a second lined pattern forming a combined pattern of intersecting lines whose intersections provide orientation points for locating the images of said reflecting areas, and moving said second pattern with respect to said first pattern to determine the distance between the reflected images from which distance said range can be determined.

10. The method of indicating the angular separation between spaced-apart reflecting objects which comprises transmitting a lined pattern to said objects, receiving from each of said objects a part of different reflected portions of said pattern on a receiver at the source of said transmission having a second lined pattern, forming a combined pattern of intersecting lines whose intersections provide reference points for locating the images of said reflecting objects, and moving said second pattern relative to said first pattern to determine the angular separation between said reflecting objects with respect to the location of the transmission source.

References Cited by the Examiner

UNITED STATES PATENTS

| | | | |
|---|---|---|---|
| 2,692,527 | 10/1954 | Wetzel et al. | 88—14 |
| 2,703,505 | 3/1955 | Senn | 88—14 |
| 3,020,792 | 2/1962 | Kingsbury | 88—1 |
| 3,053,134 | 9/1962 | Bjornson | 88—1 |
| 3,079,835 | 3/1963 | Saperstein. | |

OTHER REFERENCES

Longwell: Optical Alignment Fixture, IBM Technical Disclosure Bulletin, volume 3, No. 7, December 1960.

Astronautics Magazine, June 1961, pp. 32, 33, 44, 46.

FERGUS S. MIDDLETON, *Primary Examiner.*

RALPH D. BLAKESLEE, MILTON BUCHLER,
*Examiners.*